United States Patent
Watanabe

(10) Patent No.: US 9,571,379 B2
(45) Date of Patent: Feb. 14, 2017

(54) COMPUTER SYSTEM, COMMUNICATION CONTROL SERVER, COMMUNICATION CONTROL METHOD, AND PROGRAM

(71) Applicant: NEC Corporation, Tokyo (JP)

(72) Inventor: Yoshikazu Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 126 days.

(21) Appl. No.: 14/407,140

(22) PCT Filed: Nov. 30, 2012

(86) PCT No.: PCT/JP2012/007714
§ 371 (c)(1),
(2) Date: Dec. 11, 2014

(87) PCT Pub. No.: WO2013/186825
PCT Pub. Date: Dec. 19, 2013

(65) Prior Publication Data
US 2015/0180761 A1    Jun. 25, 2015

(30) Foreign Application Priority Data
Jun. 12, 2012 (JP) .................. 2012-132928

(51) Int. Cl.
*H04L 12/751* (2013.01)
*H04L 29/08* (2006.01)
(Continued)

(52) U.S. Cl.
CPC .......... *H04L 45/02* (2013.01); *G06F 9/45558* (2013.01); *H04L 41/12* (2013.01); *H04L 67/16* (2013.01); *H04L 45/64* (2013.01)

(58) Field of Classification Search
None
See application file for complete search history.

(56) References Cited

U.S. PATENT DOCUMENTS 6,496,847 B1 * 12/2002 Bugnion ............. G06F 9/45533
703/21
7,725,531 B1 * 5/2010 Sood ..................... G06F 15/173
709/203
(Continued)

FOREIGN PATENT DOCUMENTS

JP    2011-70549    4/2011
JP    2011-82799    4/2011
(Continued)

OTHER PUBLICATIONS

N. McKeown et al., "OpenFlow: Enabling Innovation in Campus Networks", Mar. 2008.
(Continued)

*Primary Examiner* — Ninos Donabed
(74) *Attorney, Agent, or Firm* — Finnegan, Henderson, Farabow, Garrett & Dunner, L.L.P.

(57) ABSTRACT

A computer system comprises: a forwarding node(s) that processes a packet received from any other apparatus based on a packet handling operation; a communication control server that controls the packet handling operation stored in the forwarding node(s); and a physical server(s) on which a virtual server operates, wherein the communication control server stores a topology of a communication network including the forwarding node(s) and the physical server(s) and an operating status of a virtual server(s) connected to the communication network, requests resuming an operation of a virtual server(s) in a suspended state upon occurrence of a communication request to the suspended virtual server(s), and sets a communication path for forwarding a packet for the communication request in the forwarding node(s), based on a location at which the suspended virtual server(s) is connected to the communication network after resumption of the operation.

19 Claims, 10 Drawing Sheets

(51) Int. Cl.
*G06F 9/455* (2006.01)
*H04L 12/24* (2006.01)
*H04L 12/715* (2013.01)

(56) References Cited

U.S. PATENT DOCUMENTS

| | | | | |
|---|---|---|---|---|
| 7,783,779 | B1* | 8/2010 | Scales | G06F 9/5077 709/207 |
| 8,600,943 | B1* | 12/2013 | Fitzgerald | G06F 17/30079 707/640 |
| 8,682,852 | B1* | 3/2014 | Salamon | G06F 11/1471 707/640 |
| 8,689,054 | B1* | 4/2014 | van der Goot | G06F 11/1438 714/43 |
| 8,726,067 | B1* | 5/2014 | van der Goot | G06F 11/00 714/4.11 |
| 8,966,035 | B2* | 2/2015 | Casado | H04L 49/00 709/223 |
| 9,055,386 | B2* | 6/2015 | Evans | H04W 4/003 |
| 2008/0244028 | A1* | 10/2008 | Le | G06F 3/0607 709/208 |
| 2009/0049429 | A1* | 2/2009 | Greifeneder | G06F 11/3495 717/128 |
| 2010/0257263 | A1* | 10/2010 | Casado | H04L 49/00 709/223 |
| 2011/0004708 | A1* | 1/2011 | Kondo | G06F 3/0614 710/38 |
| 2011/0184993 | A1* | 7/2011 | Chawla | G06F 17/30194 707/802 |
| 2011/0185292 | A1* | 7/2011 | Chawla | G06F 9/5077 715/760 |
| 2011/0185355 | A1* | 7/2011 | Chawla | G06F 9/5077 718/1 |
| 2011/0296411 | A1* | 12/2011 | Tang | G06F 9/45545 718/1 |
| 2011/0320632 | A1 | 12/2011 | Karino | |
| 2012/0204051 | A1 | 8/2012 | Murakami et al. | |
| 2012/0210066 | A1* | 8/2012 | Joshi | G06F 12/0866 711/118 |
| 2012/0210068 | A1* | 8/2012 | Joshi | G06F 9/45558 711/122 |
| 2013/0097377 | A1* | 4/2013 | Satoyama | G06F 3/0605 711/114 |
| 2013/0166720 | A1 | 6/2013 | Takashima et al. | |

FOREIGN PATENT DOCUMENTS

| | | |
|---|---|---|
| WO | WO 2007/108062 A1 | 9/2007 |
| WO | WO 2010/115060 A2 | 10/2010 |
| WO | WO 2011/068091 A1 | 6/2011 |
| WO | WO 2012/033117 A1 | 3/2012 |

OTHER PUBLICATIONS

"OpenFlow Switch Specification", Version 1.1.0 Implemented (Wire Protocol 0x02), pp. 1-56, Feb. 2011.
International Search Report and Written Opinion mailed Jan. 15, 2013.

* cited by examiner

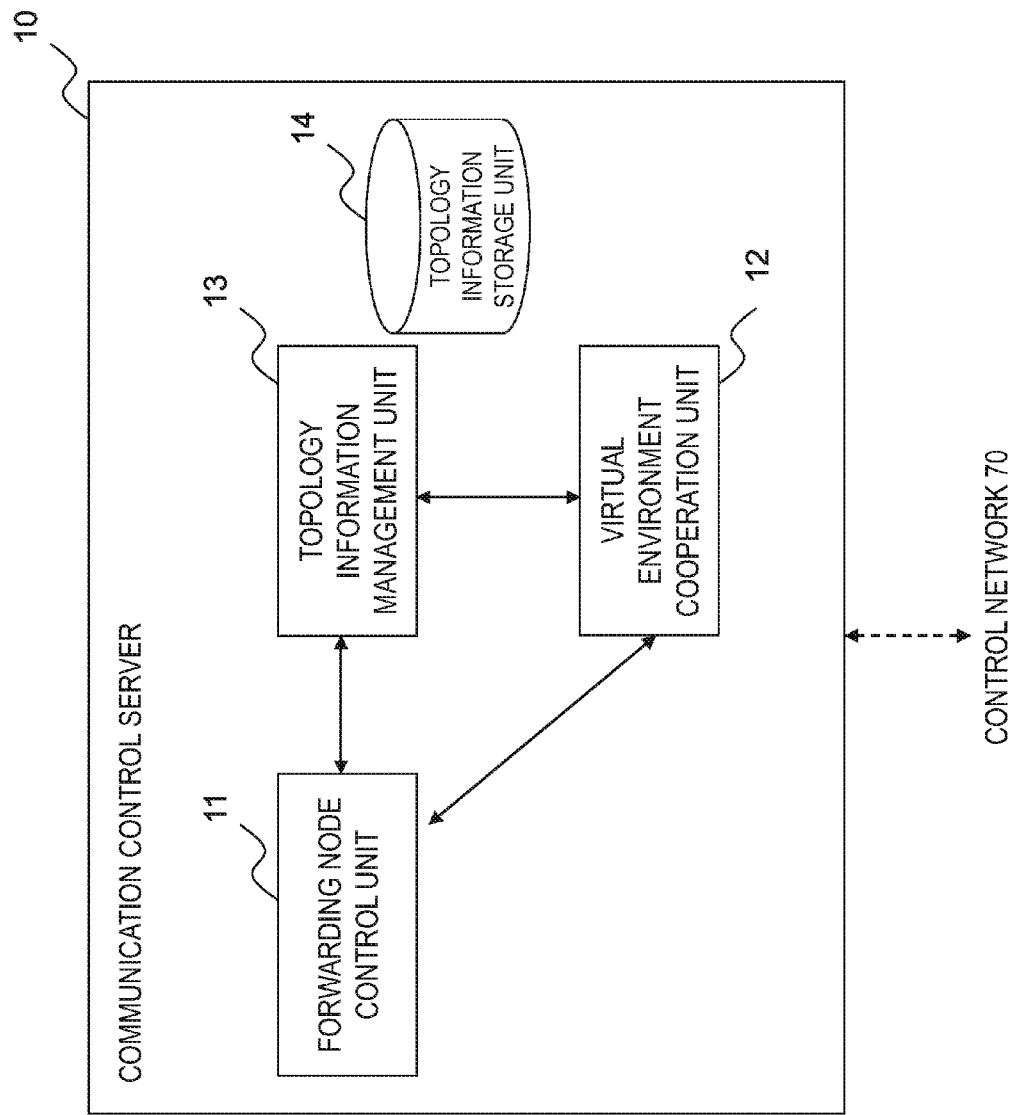

FIG. 3A (A) COMMUNICATION APPARATUS TOPOLOGY LIST

| APPARATUS NAME | PORT IDENTIFIER | APPARATUS NAME | PORT IDENTIFIER |
|---|---|---|---|
| FORWARDING NODE 20-1 | 1 | FORWARDING NODE 20-2 | 1 |
| FORWARDING NODE 20-1 | 2 | FORWARDING NODE 20-3 | 1 |
| FORWARDING NODE 20-2 | 2 | FORWARDING NODE 20-3 | 2 |
| FORWARDING NODE 20-2 | 3 | PHYSICAL SERVER 30-1 FORWARDING NODE UNIT | 1 |
| FORWARDING NODE 20-3 | 3 | PHYSICAL SERVER 30-2 FORWARDING NODE UNIT | 1 |
| PHYSICAL SERVER 30-1 FORWARDING NODE UNIT | 10 | VIRTUAL SERVER 33-1 | 1 |
| FORWARDING NODE 20-1 | 10 | CLIENT TERMINAL 60 | 1 |

FIG. 3B (B) TERMINAL INFORMATION LIST

| APPARATUS NAME | PORT IDENTIFIER | IP ADDRESS | MAC ADDRESS | STATUS |
|---|---|---|---|---|
| VIRTUAL SERVER 33-1 | 1 | 192.168.100.1 | 01:00:00:03:03:01 | ACTIVE |
| CLIENT TERMINAL 60 | 1 | 192.168.200.1 | 01:00:00:06:00:00 | ACTIVE |

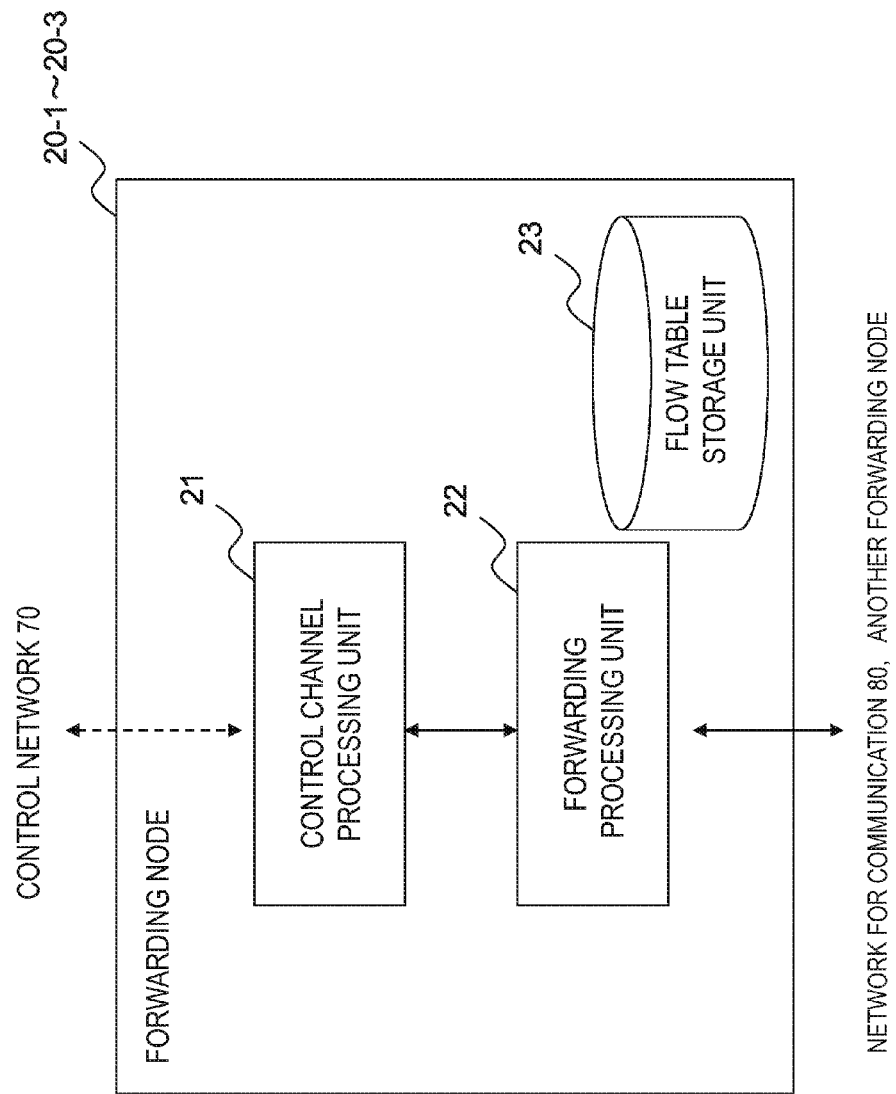

COMPUTER SYSTEM, COMMUNICATION CONTROL SERVER, COMMUNICATION CONTROL METHOD, AND PROGRAM

CROSS-REFERENCE TO RELATED APPLICATIONS

This application is a National Stage Entry of International Application No. PCT/JP2012/007714, filed Nov. 30, 2012, which is based upon and claims the benefit of the priority of Japanese patent application No. 2012-132928, filed on Jun. 12, 2012. The entire contents of the above-referenced applications are expressly incorporated herein by reference.

FIELD

The present invention relates to a computer system, communication control server, communication control method, and program, and for instance to a computer system that utilizes a virtualization technology and a communication control server, communication control method, and program in such a computer system.

BACKGROUND

In recent years, server virtualization that utilizes a virtualization technology is widely used. By utilizing a virtualization technology, the costs related to constructing and operating an infrastructure can be reduced since physical resources such as CPU (Central Processing Unit) and memory can be effectively utilized.

As a service that utilizes a virtualization technology, there is the VPS (Virtual Private Server) hosting service that rents virtual servers instead of physical servers. Compared to a rental service of physical servers, the VPS hosting service can provide services at low rates by utilizing the cost reduction effect due to virtualization.

When there is no load, the resources to be used can be further reduced by temporarily suspending the virtual server. For instance, in a case where the virtual server is a Web server, a state without any load is one in which there is no HTTP (Hypertext Transfer Protocol) communication to the virtual server. When the virtual server is suspended, the memory used by the virtual server is released after its contents are written to a disk. Further, the virtual server stops consuming the CPU resources. Therefore, temporarily suspending the virtual server increases the physical resources available to a physical server that has been running the virtual server. Further, increasing the number of virtual servers suspended reduces the number of physical servers needed to operate a system and it becomes possible to reduce costs required for bringing in and operating the system.

As a related technology, Patent Literature (PTL) 1 describes a technology that freezes a job being executed by giving a freezing instruction to a virtual server executing the job and that has the virtual server resume executing the frozen job by giving a resume instruction to the frozen virtual server. Further, Patent Literature 2 describes a technology that realizes migration of a virtual machine (virtual server) based on OpenFlow (refer to Non Patent Literatures (NPLs) 1 and 2).

PTL 1:
WO2007/108062A1
PTL 2:
Japanese Patent Kokai Publication No. JP2011-070549A NPL 1:
N. McKeown, et al., "OpenFlow: Enabling Innovation in Campus Networks," Mar. 14, 2008, [online], [searched on May 21, 2012], the Internet, <URL:http://www.openflow.org/documents/openflow-wp-latest.pdf>.
NPL 2:
"OpenFlow Switch Specification, Version 1.1.0 Implemented (Wire Protocol 0x02)," Feb. 28, 2011, [online], [searched on May 21, 2012], the Internet, <URL:http://www.openflow.org/documents/openflow-spec-v1.1.0.pdf>.

SUMMARY

The disclosures of the above listed Patent Literatures and Non Patent Literatures are incorporated herein in its entirety by reference thereto. The following analysis is given by the present inventor.

While temporarily suspending a virtual server reduces the resources to be used, it become impossible for the virtual server to respond when a communication request for the virtual server occurs. Further, even if an attempt to restart the virtual server can be made at the communication request, it may be impossible to restart the virtual server, depending on the resource usage of the physical server that was running the virtual server, and this communication request may not be processed.

Further, according to the technology described in Patent Literature 1, the virtual server is frozen along with an active job and the frozen job is restarted at the restart of the virtual server. Therefore, in the technology described in Patent Literature 1, freezing an active job may decrease the response of the job (an increase in the turnaround time). Further, according to the technology described in Patent Literature 1, since the virtual server is restarted on the physical server that was running the virtual server, the virtual server may not be able to be restarted, depending on the resource usage of the physical server.

Therefore, there is a need in the art to effectively utilize physical resources while minimizing the degradation of the communication response performance.

According to a first aspect of the present disclosure, there is provided a computer system, comprising:
a forwarding node(s) that stores a flow and a packet handling operation defining processing for a packet belonging to the flow in association with each other, and processes a packet received from any other apparatus based on the packet handling operation;
a communication control server that controls the packet handling operation stored in the forwarding node(s); and
a physical server(s) on which a virtual server operates, wherein the communication control server comprises:
a topology information storage unit that stores a topology of a communication network including the forwarding node(s) and the physical server(s), and an operating status of a virtual server(s) connected to the communication network;
a virtual environment cooperation unit that requests resuming an operation of a virtual server(s) in a suspended state upon occurrence of a communication request to the suspended virtual server(s); and
a forwarding node control unit that sets a communication path for forwarding a packet for the communication request in the forwarding node, based on a location at which the suspended virtual server(s) is connected to the communication network after resumption of the operation.

According to a second aspect of the present disclosure, there is provided a communication control server, controlling a packet handling operation stored in a forwarding node(s) that stores a flow and the packet handling operation in association with each other and processes a packet received from any other apparatus based on the packet handling operation, the packet handling operation defining processing for a packet belonging to the flow, the communication control server comprising:

a topology information storage unit that stores a topology of a communication network including the forwarding node(s) and a physical server(s) on which a virtual server(s) operates, and an operating status of a virtual server(s) connected to the communication network;

a virtual environment cooperation unit that requests resuming an operation of a virtual server(s) in a suspended state upon occurrence of a communication request to the suspended virtual server(s); and a forwarding node control unit that sets a communication path for forwarding a packet for the communication request in the forwarding node(s), based on a location at which the suspended virtual server(s) is connected the communication network after resumption of the operation.

According to a third aspect of the present disclosure, there is provided a communication control method, comprising:

by a communication control server that controls a packet handling operation stored in a forwarding node(s) that stores a flow and the packet handling operation in association with each other and processes a packet received from any other apparatus based on the packet handling operation, the packet handling operation defining processing for a packet belonging to the flow, storing in a storage unit a topology of a communication network including the forwarding node(s) and a physical server(s) providing a virtual server(s), and an operating status of a virtual server(s) connected to the communication network;

requesting resuming an operation of a virtual server(s) in a suspended state upon occurrence of a communication request to the suspended virtual server(s); and setting a communication path for forwarding a packet for the communication request in the forwarding node(s), based on a location at which the suspended virtual server(s) is connected the communication network after resumption of the operation.

According to a fourth aspect of the present disclosure, there is provided a program, causing a computer for controlling a packet handling operation stored in a forwarding node(s) that stores a flow and the packet handling operation and processes a packet received from any other apparatus based on the packet handling operation, the packet handling operation defining processing for a packet belonging to the flow, to execute:

storing in a storage unit a topology of a communication network including the forwarding node(s) and a physical server(s) providing a virtual server(s), and an operating status of a virtual server(s) connected to the communication network;

requesting resuming an operation of a virtual server(s) in a suspended state upon occurrence of a communication request to the suspended virtual server(s); and setting a communication path for forwarding a packet for the communication request in the forwarding node(s), based on a location at which the suspended virtual server(s) is connected to the communication network after resumption of the operation.

Further, the program can be provided as a program product stored in a non-transitory computer-readable storage medium.

The present invention provides the following advantage, but not restricted thereto. According to a computer system, communication control server, communication control method, and program relating to the present disclosure, the physical resources can be effectively utilized while minimizing the degradation of the communication response performance of a virtual server(s).

BRIEF DESCRIPTION OF THE DRAWINGS

FIG. 2 is a block diagram illustrating a configuration example of a communication control server.

FIGS. 3A and 3B are explanatory diagrams showing an example of topology information.

FIG. 4 is a block diagram illustrating a configuration example of a forwarding node.

PREFERRED MODES

Figure 1:
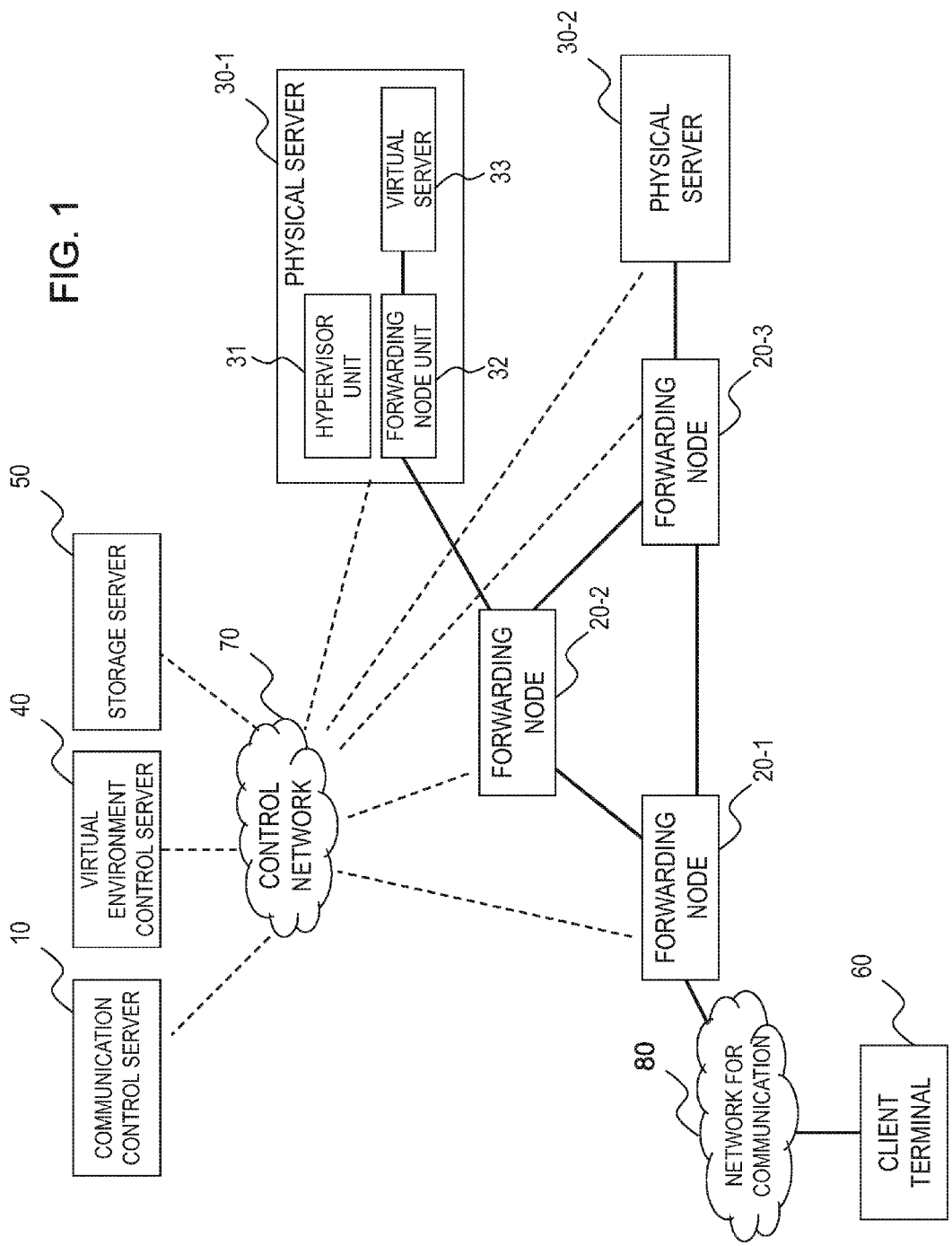
FIG. 1 is an explanatory diagram illustrating a configuration example of a computer system relating to an exemplary embodiment.

In the present disclosure, there are various possible modes, which include the following, but not restricted thereto. First, a summary of an exemplary embodiment will be given. Note that the drawing reference signs used in the summary are given solely to facilitate understanding and not to limit the present disclosure to the illustrated aspects.

FIG. 1 is a drawing illustrating the configuration of a computer system relating to an exemplary embodiment. Further, FIG. 2 is a block diagram illustrating a communication control server (10) provided in the computer system shown in FIG. 1.

With reference to FIG. 1, the computer system comprises forwarding nodes (20-1 to 20-3) that stores a flow and a packet handling operation defining processing for a packet belonging to the flow in association with each other, and process a packet received from any other apparatus based on the packet handling operation; the communication control server (10) that controls the packet handling operation stored in the forwarding nodes (20-1 to 20-3); and physical servers (30-1 and 30-2) on which a virtual server (33) operates. In FIG. 1, there are three forwarding nodes and two physical servers, but the numbers of these apparatuses are not limited thereto.

With reference to FIG. 2, the communication control server (10) comprises a topology information storage unit (14) that stores a topology of a communication network including the forwarding nodes (20-1 to 20-3) and the physical servers (30-1 and 30-2), and an operating status of the virtual server (33) connected to the communication network; a virtual environment cooperation unit (12) that requests resuming an operation of the virtual server(s) in a suspended state at the occurrence of a communication request to the suspended virtual server(s); and a forwarding node control unit (11) that sets a communication path for forwarding a packet for the communication request in the forwarding nodes (20-1 to 20-3), based on a location at which the suspended virtual server(s) is connected to the communication network after resumption of the operation.

According to an exemplary embodiment, upon detecting a communication request to a virtual server in a suspended state, the communication control server (10) requests resuming of the virtual server and sets a communication path corresponding to a new execution environment for the virtual server. By temporarily suspending a virtual server without any load, physical resources can be effectively utilized and a decrease in the response of services provided by the virtual server can be prevented. Further, according to an exemplary embodiment, since a proper communication path is set between a client terminal that sent the communication request and the restarted virtual server, the degradation of the communication response performance of the virtual server when a communication request occurs can be minimized.

Further, the following modes are possible in the present disclosure.

(Mode 1)

A computer system may be the computer system relating to the first aspect.

(Mode 2)

The forwarding node control unit may control so that the packet for the communication request is transmitted to the suspended virtual server(s) after completion of resumption of the operation of the suspended virtual server(s).

(Mode 3)

The suspended virtual server(s) may be suspended by releasing a physical resource of the physical server(s) due to not receiving any communication request for a predetermined period.

(Mode 4)

The forwarding node control unit may set a communication path for forwarding the packet for the communication request in the forwarding node(s) in a case where a communication based on the communication request is permitted by the suspended virtual server(s), and otherwise discard the packet for the communication request.

(Mode 5)

The computer system may further comprise:
a virtual environment control server that selects a physical server that resumes an operation of the suspended virtual server(s) from a plurality of physical servers, based on a state of each of the plurality of physical servers providing a virtual server(s) and a topology of a communication network including the forwarding node(s) and the plurality of physical servers, wherein
the virtual environment cooperation unit requests the virtual environment control server to resume an operation of the suspended virtual server(s).

(Mode 6)

The virtual environment control server may collect availability of a physical resource of each of the plurality of physical servers from each physical server.

(Mode 7)

The virtual environment control server may preferentially select a physical server on which the suspended virtual server(s) had operated before being suspended as a physical server that resumes the operation of the suspended virtual server(s).

(Mode 8)

The virtual environment control server may select a physical server with most available physical resources as a physical server that resumes the operation of the suspended virtual server(s).

(Mode 9)

The virtual environment control server may select a physical server suitable for the communication with a client terminal that has transmitted the communication request as a physical server that resumes the operation of the suspended virtual server(s).

(Mode 10)

A communication control server may be the communication control server relating to the second aspect.

(Mode 11)

In the communication control server, the forwarding node control unit may control so that the packet for the communication request is transmitted to the suspended virtual server(s) after completion of resumption of the operation of the suspended virtual server(s).

(Mode 12)

In the communication control server, the suspended virtual server(s) may be suspended by releasing a physical resource of the physical server(s) due to not receiving any communication request for a predetermined period.

(Mode 13)

In the communication control server, the forwarding node control unit may set a communication path for forwarding the packet for the communication request in the forwarding node(s) in a case where a communication based on the communication request is permitted by the suspended virtual server(s), and otherwise discard the packet for the communication request.

(Mode 14)

In the communication control server, the virtual environment cooperation unit may request a virtual environment control server to resume an operation of the suspended virtual server(s), and the virtual environment control server may select a physical server that resumes an operation of the suspended virtual server(s) from a plurality of physical servers, based on a state of each of the plurality of physical servers providing a virtual server(s) and a topology of a communication network including the forwarding node(s) and the plurality of physical servers.

(Mode 15)

A communication control method may be the communication control method relating to the third aspect.

(Mode 16)

In the communication control method, the communication control server may control so that the packet for the communication request is transmitted to the suspended virtual server(s) after completion of resumption of the operation of the suspended virtual server(s).

(Mode 17)

In the communication control method, the suspended virtual server(s) may be suspended by releasing a physical resource of the physical server(s) due to not receiving any communication request for a predetermined period.

(Mode 18)

In the communication control method, the communication control server may set a communication path for forwarding the packet for the communication request in the forwarding node(s) in a case where a communication based on the communication request is permitted by the suspended virtual server(s), and discard the packet for the communication request.

(Mode 19)

The communication control method may further comprise: requesting a virtual environment control server to resume an operation of the suspended virtual server(s), wherein the virtual environment control server may select a physical server that resumes an operation of the suspended virtual server(s) from a plurality of physical servers, based on a state of each of the plurality of physical servers providing a virtual server and a topology of a communication network including the forwarding node(s) and the plurality of physical servers.

(Mode 20)

A program may be the program relating to the fourth aspect.

(Mode 21)

The program may cause the computer to execute:
controlling so that the packet for the communication request is transmitted to the suspended virtual server(s) after completion of resumption of the operation of the suspended virtual server(s).

(Mode 22)

In the program, the suspended virtual server(s) may be suspended by releasing a physical resource of the physical server(s) due to not receiving any communication request for a predetermined period.

(Mode 23)

The program may cause the computer to execute:
setting a communication path for forwarding the packet for the communication request in the forwarding node(s) in a case where a communication based on the communication request is permitted by the suspended virtual server(s), and otherwise discarding the packet for the communication request.

(Mode 24)

The program may cause the computer to execute:
requesting a virtual environment control server to resume an operation of the suspended virtual server(s), wherein the virtual environment control server may select a physical server that resumes an operation of the suspended virtual server(s) from a plurality of physical servers, based on a state of each of the plurality of physical servers providing a virtual server(s) and a topology of a communication network including the forwarding node(s) and the plurality of physical servers.

First, a summary of common configuration and operation among exemplary embodiments of the present disclosure will be given. FIG. 1 is an explanatory diagram showing a configuration example of the computer system according to the present disclosure. The computer system illustrated in FIG. 1 comprises a communication control server 10, the forwarding nodes 20-1 to 20-3, physical servers 30-1 and 30-2, a virtual environment control server 40, a storage server 50, a client terminal 60, a control network 70, and a network for communication 80.

Further, the physical servers 30-1 and 30-2 comprise a hypervisor unit 31, a forwarding node unit 32, and a virtual server 33. The forwarding node unit 32 of the physical servers 30-1 and 30-2 basically has the same functions as the forwarding nodes 20-1 to 20-3. When something is simply described as "forwarding node" hereinafter, it denotes any one of the forwarding nodes 20-1 to 20-3 and the forwarding node unit 32 of the physical servers 30-1 and 30-2.

A forwarding node connects to and communicates with other forwarding nodes, the physical servers 30-1 and 30-2, the virtual server 33, and the network for communication 80. In the example shown in FIG. 1, communication paths performed by the forwarding nodes are denoted by solid lines. Further, the forwarding node is connected to the control network 70 and executes control communication (control channel) with the communication control server 10 via the control network 70. In the example shown in FIG. 1, control channels communicated between the forwarding nodes and the communication control server 10 are denoted by broken lines. Note that the number of each apparatus and the topology shown in FIG. 1 are an example, and the computer system according to the present disclosure is not limited to the configuration illustrated in FIG. 1.

A forwarding node receives a packet from the physical server 30-1 or 30-2, the virtual server 33, the network for communication 80, or another forwarding node connected thereto and processes the received packet based on a packet handling operation (flow entry) included in a flow table held therein. More concretely, the forwarding node performs some kind of processing on the received packet or forwards the received packet to another apparatus. Further, when there is no flow entry corresponding to the received packet in the flow table, the forwarding node notifies the communication control server 10 of the received packet.

From the forwarding node, the communication control server 10 receives the packet that does not have any corresponding flow entry (packet handling operation) and calculates a path for the packet. Further, the communication control server 10 controls the communication within the computer system by adding a flow entry corresponding to the received packet to the forwarding node. More concretely, the communication control server 10 gives an instruction to make a change to a packet handling operation such as adding/deleting a packet handling operation to/from ones stored in the forwarding node. In other words, the communication control server 10 controls packet handling operations stored in the forwarding node.

In an OpenFlow network, the forwarding node corresponds to OpenFlow Switch, and the communication control server 10 corresponds to OpenFlow Controller.

The physical servers 30-1 and 30-2 comprise physical resources for running the virtual server 33 such as a CPU and memory, and run the virtual server 33 under the control of the virtual environment control server 40. Further, as described above, the physical servers 30-1 and 30-2 comprise the forwarding node unit 32, and have the virtual server 33 perform packet processing with the other forwarding nodes.

The virtual environment control server 40 controls a virtual environment realized by the physical servers 30-1 and 30-2 and the storage server 50. The virtual environment control server 40 is connected to the physical servers 30-1 and 30-2 via the control network 70, and controls the active state of the virtual server 33 on the physical servers 30-1 and 30-2. For instance, the control of the active state includes starting, shutting off, suspending, and restarting the virtual server 33, and migrating it to another physical server. However, the control of the active state is not limited thereto.

The storage server 50 stores the data and statuses (disk image, suspend image, snapshot, etc.) of the virtual server running on the physical servers 30-1 and 30-2.

The client terminal 60 is a terminal apparatus that uses the server functions (for instance a Web server) provided by the virtual server 33 running on the physical servers 30-1 and 30-2. The client terminal 60 may be a desktop PC (Personal Computer), note PC, smart phone, and mobile phone. However, the client terminal 60 is not limited thereto.

The control network 70 is a communication network that enables the communication control server 10, the forwarding nodes, the physical servers 30-1 and 30-2, the virtual environment control server 40, and the storage server 50 to perform communication with each other such as communication of a control message. For instance, the control network 70 can be realized as a network in which apparatuses such as an Ethernet (registered trademark) switch and an IP (Internet Protocol) router are connected to each other.

The network for communication 80 connects between the communication network realized by the communication control server 10 and the forwarding nodes and the client terminal 60. For instance, the network for communication 80 can be realized as a network in which apparatuses such as an Ethernet switch and an IP router are connected to each other.

(First Exemplary Embodiment)

Next, a computer system relating to a first exemplary embodiment will be described with reference to the drawings.

FIG. 2 is a block diagram showing a configuration example of the communication control server 10. The control server 10 illustrated in FIG. 2 comprises a forwarding node control unit 11, a virtual environment cooperation unit 12, a topology information management unit 13, and a topology information storage unit 14.

The forwarding node control unit 11 is connected to the control network 70 and performs control communication (control channel) with the forwarding node via the control network 70. For instance, the communication by the control channel includes packet notification from the forwarding node to the communication control server 10, packet transmission from the communication control server 10 to the forwarding node, and an instruction for adding, deleting, and changing a flow entry from the communication control server 10 to the forwarding node.

Further, upon receiving a packet notification from a forwarding node, the forwarding node control unit 11 calculates a path and creates a flow entry (flow entries). The forwarding node control unit 11 uses a general method to calculate the path. For instance, the forwarding node control unit 11 may calculate the path using the Shortest Path or based on STP (Spanning Tree Protocol). After calculating the path, the forwarding node control unit 11 creates a flow entry to be added for each forwarding node included on the calculated path. The forwarding node control unit 11 transmits the created flow entry to each forwarding node and instructs the flow entry to be added to packet handling operations.

The topology information storage unit 14 stores network topology information (simply referred to as "topology information" hereinafter). The topology information stored by the topology information storage unit 14 includes the connection relation between the forwarding nodes, the connection relation between the forwarding nodes and the virtual server, the connection relation between the forwarding nodes and the network for communication 80 or the client terminal 60, and information of the virtual server and the client terminal 60 (the used IP address, MAC (Media Access Control) address and operating state).

FIGS. 3A and 3B are explanatory diagrams showing an example of the topology information stored in the topology information storage unit 14. FIG. 3A is an example of a list showing connection relations between the forwarding nodes, between the forwarding node and the virtual server 33, and between the forwarding node and the client terminal 60. For instance, the first row in the list shown in FIG. 3A indicates that the port of a port identifier 1 of the forwarding node 20-1 is connected to the port of a port identifier 1 of the forwarding node 20-2.

Further, FIG. 3B is an example of an information list of the terminals (the virtual server 33 and the client terminal 60) connected to each port of the forwarding node. For instance, the first row in the list shown in FIG. 3B indicates that the port of a port identifier 1 of the virtual server 33-1 uses "192.168.100.1" as its IP address, the MAC address is "01:00:00:03:03:01," and the virtual server 33-1 is in an "active" state. In addition to the "active" state indicating that the apparatus is operating, examples of the apparatus states include "suspended" state indicating that the apparatus is temporarily suspending its operation.

The topology information management unit 13 detects the network topology within the computer system and manages it as the topology information. More concretely, the topology information management unit 13 stores the detected topology information in the topology information storage unit 14. Further, the topology information management unit 13 may use the control channel in order to transmit/receive a packet relating to the topology detection to/from any port of any forwarding node.

The topology information management unit 13 uses a general method to detect the topology. For instance, the technologies used by the topology information management unit 13 to detect the topology include LLDP (Link Layer Discovery Protocol), DHCP (Dynamic Host Configuration Protocol) snooping or cooperation with a DHCP server, cooperation with user authentication (for instance IEEE 802.1x), detecting a Gratuitous ARP packet transmitted by a communication host, and STP (Spanning Tree Protocol).

The virtual environment cooperation unit 12 communicates with the virtual environment control server 40, requesting control of the virtual server 33 or requesting information of the virtual environment.

The forwarding node control unit 11, the virtual environment cooperation unit 12, and the topology information management unit 13 are realized by the CPU of a computer operating according to a program (communication control program). For instance, the program may be stored in a storage unit (not shown in the drawings) of the communication control server 10, and the CPU may read the program and operate as the forwarding node control unit 11, the virtual environment cooperation unit 12, and the topology information management unit 13 according to the program. Further, each of the forwarding node control unit 11, the virtual environment cooperation unit 12, and the topology information management unit 13 may be realized by dedicated hardware.

Further, the topology information storage unit 14 can be realized by memory and a magnetic disk.

FIG. 4 is a block diagram illustrating a configuration example of the forwarding nodes 20-1 to 20-3. With reference to FIG. 4, the forwarding nodes 20-1 to 20-3 comprise a control channel processing unit 21, a forwarding processing unit 22, and a flow table storage unit 23.

The control channel processing unit 21 is connected to the control network 70 and executes control communication (control channel) with the forwarding node control unit 11 of the communication control server 10 via the control network 70. Further, upon receiving the notification of a packet that does not have any corresponding flow entry from the forwarding processing unit 22, the control channel processing unit 21 notifies the communication control server 10 of the packet using the control channel.

Further, when the communication control server 10 instructs the control channel processing unit 21 to add, change, or delete a flow entry via the control channel, the control channel processing unit 21 instructs the forwarding processing unit 22 to make a change based on the content of the instruction. Further, when the communication control server 10 instructs the control channel processing unit 21 to output a packet via the control channel, the control channel processing unit 21 instructs the forwarding processing unit 22 to output the packet based on the content of the instruction.

The flow table storage unit 23 stores the flow table including packet handling operations (flow entries). A packet handling operation (flow entry) is stored in the flow table storage unit 23 by the forwarding processing unit 22.

The forwarding processing unit 22 is connected to the other apparatuses (for instance the other forwarding nodes, the network for communication 80, and the virtual server 33) and transmits/receives a packet to/from the connected apparatuses. Further, the forwarding processing unit 22 manages the flow table stored in the flow table storage unit 23.

Upon receiving a packet from another apparatus, the forwarding processing unit 22 searches for a flow entry corresponding to the received packet in the flow table. When a flow entry corresponding to the received packet is found in the flow table, the forwarding processing unit 22 performs processing according to the action of this flow entry. Meanwhile, when no flow entry corresponding to the received packet is found in the flow table, the forwarding processing unit 22 notifies the control channel processing unit 21 that no flow entry exists for the received packet.

Further, the forwarding processing unit 22 comprises a plurality of ports for communicating with the other apparatuses, and the ports are connected to different ports of the other forwarding nodes or the virtual server 33. Further, each port is identified by a port identifier.

The processing performed by the forwarding processing unit 22 based on the action of a flow entry includes the following. Further, the processing performed by the forwarding processing unit 22 is not limited to one action and it may be two actions or more. Note that the processing specified by the action of a flow entry is not limited to the following.

Output a packet from a specified port
Change a destination MAC address of a packet to a specified value
Change a source MAC address of a packet to a specified value
Change a destination IP address of a packet to a specified value
Change a source IP address of a packet to a specified value
Change a destination port number of a packet to a specified value
Change a source port number of a packet to a specified value
Add a VLAN (Virtual Local Area Network) tag to a packet
Delete a VLAN tag of a packet
Change a VLAN tag of a packet As an example, the control channel processing unit 21 and the forwarding processing unit 22 can be realized by the CPU of a computer operating according to a program. Further, each of the control channel processing unit 21 and the forwarding processing unit 22 may be realized by dedicated hardware.

Figure 5:
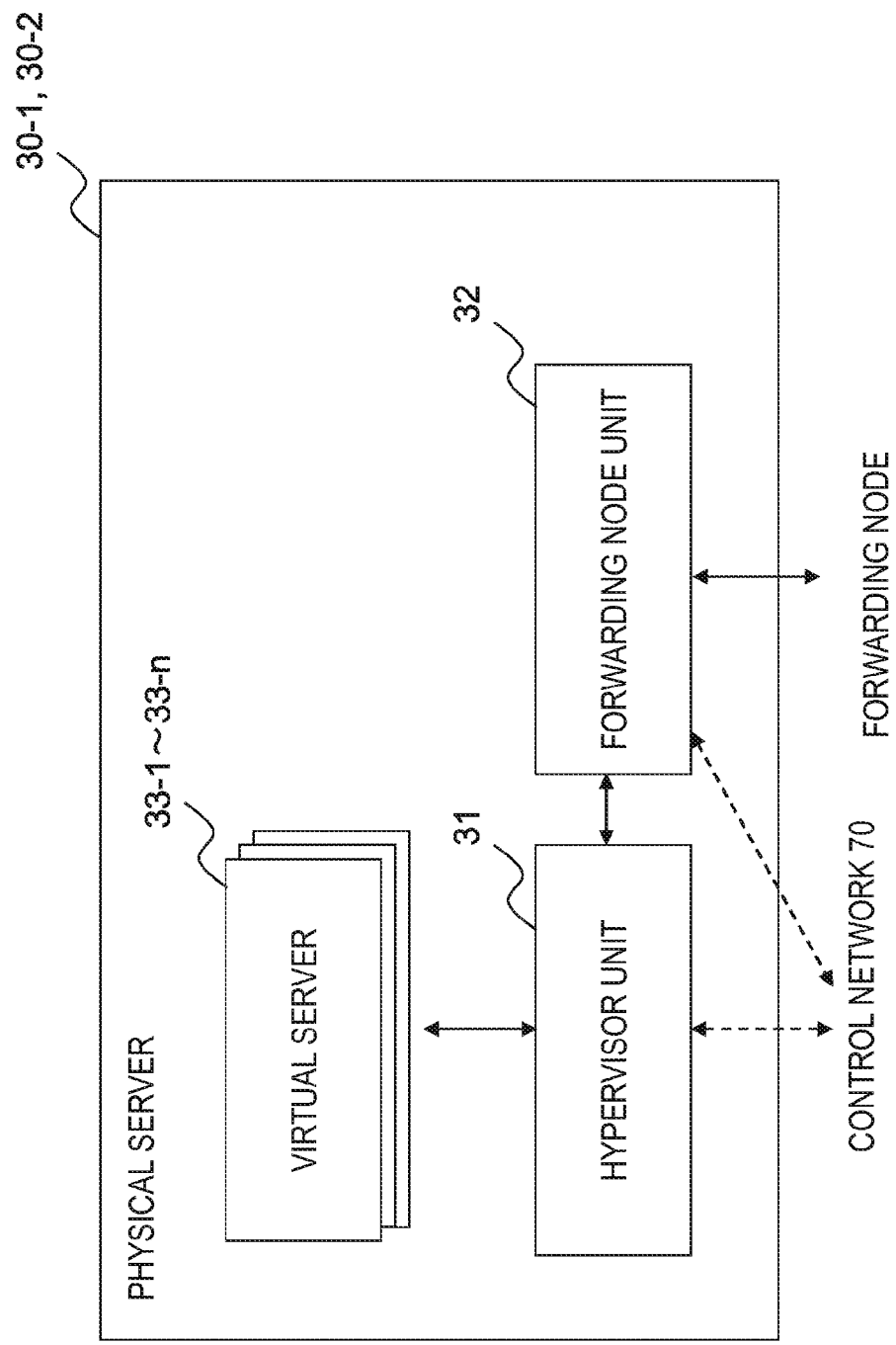
FIG. 5 is a block diagram showing a configuration example of a physical server.

FIG. 5 is a block diagram showing a configuration example of the physical servers 30-1 and 30-2. With reference to FIG. 5, the physical servers 30-1 and 30-2 comprise a hypervisor unit 31, a forwarding node unit 32, and virtual servers 33-1 to 33-n.

The hypervisor unit 31 virtualizes the physical resources comprised by the physical servers 30-1 and 30-2 such as the CPU, the memory, and I/Os (Input/Output) of a disk and communication interface, provides them to the virtual servers 33-1 to 33-n, and controls the execution on the virtual resources of the virtual servers 33-1 to 33-n. The hypervisor unit 31 communicates with the virtual environment control server 40 via the control network 70, receiving an instruction regarding the control of the virtual servers 33-1 to 33-n, notifying the status of the virtual servers 33-1 to 33-n, or notifying the state of the physical resources. Further, the hypervisor unit 31 communicates with the storage server 50 via the control network 70 and reads/writes disk images of the virtual servers 33-1 to 33-n stored in the storage server 50. Further, the hypervisor unit 31 relays communication on the virtualized communication interface between the virtual servers 33-1 to 33-n and the forwarding node unit 32.

The forwarding node unit 32 has the same functions as the forwarding nodes 20-1 to 20-3, performs packet processing based on a flow entry, and communicates with the communication control server 10. The forwarding node unit 32 differs from the forwarding nodes 20-1 to 20-3 in that the forwarding node unit 32 is constituted as part of the physical servers 30-1 and 30-2 and processes packets transmitted/received on the virtualized communication interface used by the virtual servers 33-1 to 33-n. The forwarding node unit 32 may be implemented as a software program or hardware.

The virtual servers 33-1 to 33-n are run by using the virtualized resources (CPU, memory, etc.) provided by the hypervisor unit 31 and operate according to a program. The program for the virtual servers 33-1 to 33-n may be stored in a virtualized disk. For instance, the actual disk is stored in the storage server 50 and can be read/written by the virtual servers 33-1 and 33-n thanks to the action of the hypervisor unit 31. The number of virtual servers executed on a certain physical server may be zero or greater. Further, the virtual servers 33-1 to 33-n can migrate between the physical servers during execution, thanks to the action of the hypervisor unit 31 and the virtual environment control server 40.

Figure 6:
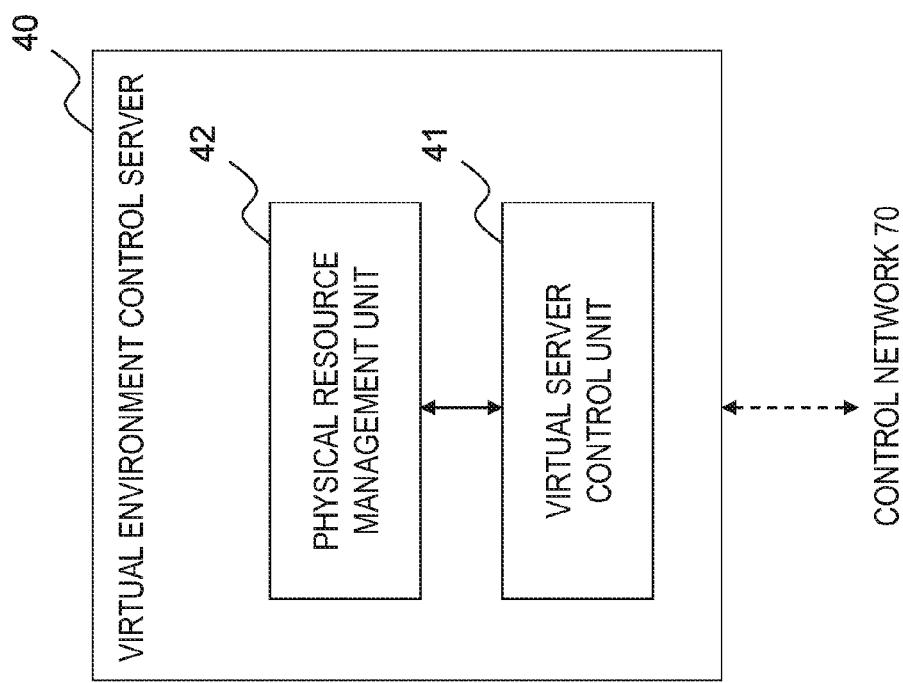
FIG. 6 is a block diagram showing a configuration example of a virtual environment control server.

FIG. 6 is a block diagram showing a configuration example of the virtual environment control server 40. With reference to FIG. 6, the virtual environment control server 40 comprises a virtual server control unit 41 and a physical resource management unit 42.

The virtual server control unit 41 communicates a control message with the physical servers 30-1 and 30-2 via the control network 70, transmits instructions to control the virtual servers 33-1 to 33-n to the physical servers 30-1 and 30-2, and receives a notification on information regarding the physical resources and a change in the state of the virtual servers 33-1 to 33-n from the physical servers 30-1 and 30-2. The instructions to control the virtual servers includes starting, shutting off, suspending, and restarting the virtual server, and migrating it to another physical machine. Further, based on a request from another module (for instance the virtual environment cooperation unit 12 of the communication control server 10), the virtual server control unit 41 controls the virtual servers 33-1 to 33-n and notifies the status of the virtual servers 33-1 to 33-n as a response.

The physical resource management unit 42 stores information regarding the physical resources collected by the virtual server control unit 41 from the physical servers 30-1 and 30-2, and manages the amount of free physical resources.

Next, an operation of the computer system relating to the present disclosure will be described with reference to the drawings.

<Operation in Which the Client Terminal 60 Transmits a Packet to the Virtual Server 33-1>

First, an operation in which the client terminal 60 transmits a packet to the virtual server 33-1 will be described. In the description below, it is assumed that the following conditions hold.

The client terminal 60 knows the IP address of the virtual server 33-1.

No flow entry regarding the communication between the client terminal 60 and the virtual server 33-1 is set in the forwarding node.

The virtual server 33-1 is active on the physical server 30-1 or suspended.

The communication control server 10 has obtained the topology information.

The topology information storage unit 14 of the communication control server 10 stores that the virtual server 33-1 is connected to the forwarding node unit 32 of the physical server 30-1 and that the state of the virtual server 33-1 is either "active" or "suspended."

Figure 7:
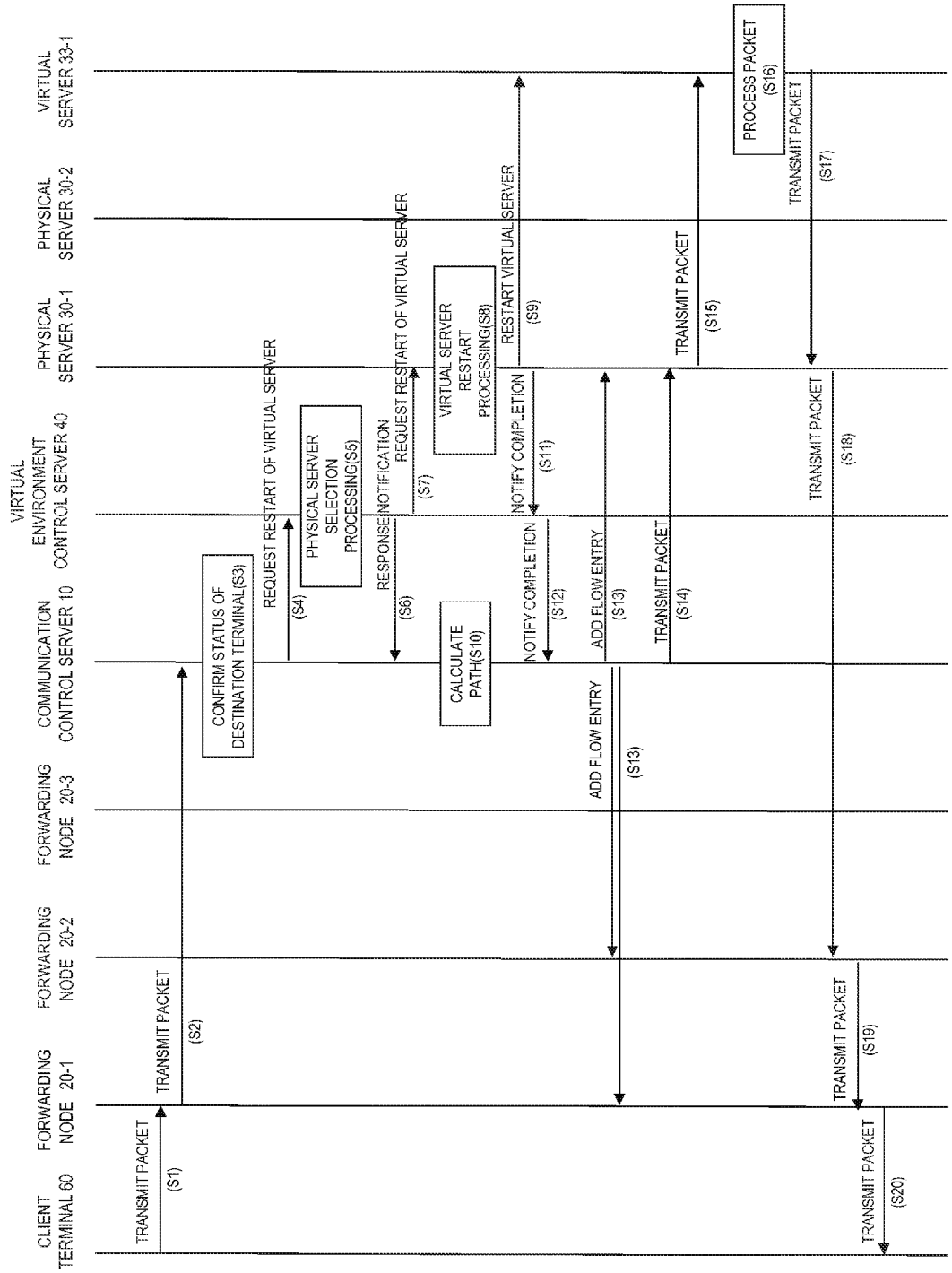
FIG. 7 is a sequence diagram showing an operation example of a computer system relating to a first exemplary embodiment.

First, an operation in a case where the virtual server 33-1 is active, and a case where the virtual server 33-1 is suspended and can be restarted on the physical server 30-1 will be described with reference to FIG. 7. FIG. 7 is a sequence diagram showing an operation example of the computer system in the present exemplary embodiment.

The client terminal 60 transmits a packet to the virtual server 33-1 (step S1). Examples of this packet include a TCP SYN (Transmission Control Protocol Synchronization) packet to the port number (80) for HTTP. The packet is delivered to the forwarding node 20-1 via the network for communication 80.

The forwarding node 20-1 processes the packet received from the client terminal 60, and transmits the packet to the communication control server 10 as a result of the processing (step S2). More concretely, first the forwarding processing unit 22 of the forwarding node 20-1 searches for a flow entry corresponding to the received packet. Since no corresponding flow entry is found here, the received packet is notified to the control channel processing unit 21, which further transmits the received packet to the communication control server 10 via the control channel.

The forwarding node control unit 11 of the communication control server 10 confirms the state of the destination terminal of the received packet (step S3). More concretely, the forwarding node control unit 11 of the communication control server 10 refers to, for instance, the destination IP address of the received packet and the topology information stored in the topology information storage unit 14, identifies the destination terminal, and acquires the operating state thereof. When the destination terminal is "active," steps S4 to S9 and steps S11 and S12 are omitted. Meanwhile, when the destination terminal is "suspended," the step S4 and the subsequent steps are executed.

The virtual environment cooperation unit 12 of the communication control server 10 requests the virtual environment control server 40 to restart the virtual server 33-1 (step S4).

The virtual environment control server 40 selects a physical server for restarting the virtual server 33-1 based on the received request to restart the virtual server 33-1 (step S5). As an example of a method for selecting a physical server, if the physical server used by the virtual server when it entered the suspended state has sufficient resources necessary to restart the virtual server, this physical server may be selected. Meanwhile, if it does not have sufficient resources, another physical server with sufficient resources may be selected. Here, it is assumed that the physical server 30-1 is selected.

The virtual environment control server 40 transmits a response notification including information of the physical server selected in the step S5 to the communication control server 10 (step S6).

The virtual environment control server 40 requests the physical server 30-1, the physical server selected in the step S5, to restart the virtual server 33-1 (step S7).

The hypervisor unit 31 of the physical server 30-1 performs restart processing on the virtual server 33-1 (step S8).

At the completion of the step S8, the virtual server 33-1 starts to operate on the physical server 30-1 (step S9).

In parallel to the steps S7 to S9, the communication control server 10 calculates a path between the client terminal 60 and the virtual server 33-1 (step S10). At this time, the forwarding node control unit 11 of the communication control server 10 determines to which forwarding node the virtual server 33-1 is connected based on the information of the physical server received in the step S6. Here, it is assumed that the calculated path between the client terminal 60 and the virtual server 33-1 goes through the forwarding node 20-1, the forwarding node 20-2, and the forwarding node unit 32 of the physical server 30-1 in this order.

The hypervisor unit 31 of the physical server 30-1 notifies the virtual environment control server 40 that the restart of the virtual server 33-1 has been completed (step S11).

The virtual environment control server 40 notifies the communication control server 10, which requested the virtual server to be restarted in the step S4, that the restart of the virtual server 33-1 has been completed (step S12).

The forwarding node control unit 11 of the communication control server 10 adds flow entries based on the calculated path to the forwarding nodes on the path calculated in the step S10 (step S13).

The forwarding node control unit 11 of the communication control server 10 transmits the packet received in the step S2 to the forwarding node unit 32 of the physical server 30-1, and instruct it to transmit the packet to the virtual server 33-1 (step S14).

The forwarding node unit 32 of the physical server 30-1 transmits the packet received in the step S14 to the virtual server 33-1 (step S15).

The virtual server 33-1 processes the packet received in the step S15 (step S16). Examples of the processing include a TCP connection establishment process and the creation of a response packet (TCP SYN-ACK packet) when the received packet is a TCP SYN packet.

The virtual server 33-1 transmits the packet created as a result of the step S16 to the client terminal 60 (step S17).

The forwarding node unit 32 of the physical server 30-1 processes the packet received from the virtual server 33-1 and transmits the packet to the forwarding node 20-2 as a result thereof (step S18). More concretely, first the forwarding node unit 32 of the physical server 30-1 searches for a flow entry corresponding to the received packet. Here, the flow entry added in the step S13 is found as the corresponding flow entry, and the packet is transmitted to the forwarding node 20-2 based on this flow entry.

Similarly, the forwarding node 20-2 processes the packet received from the forwarding node unit 32 of the physical server 30-1 and transmits the packet to the forwarding node 20-1 as a result thereof (step S19). The forwarding node 20-1 processes the packet received from the forwarding node 20-2 and transmits the packet to the client terminal 60 via the network for communication 80 as a result thereof (step S20).

Figure 8:
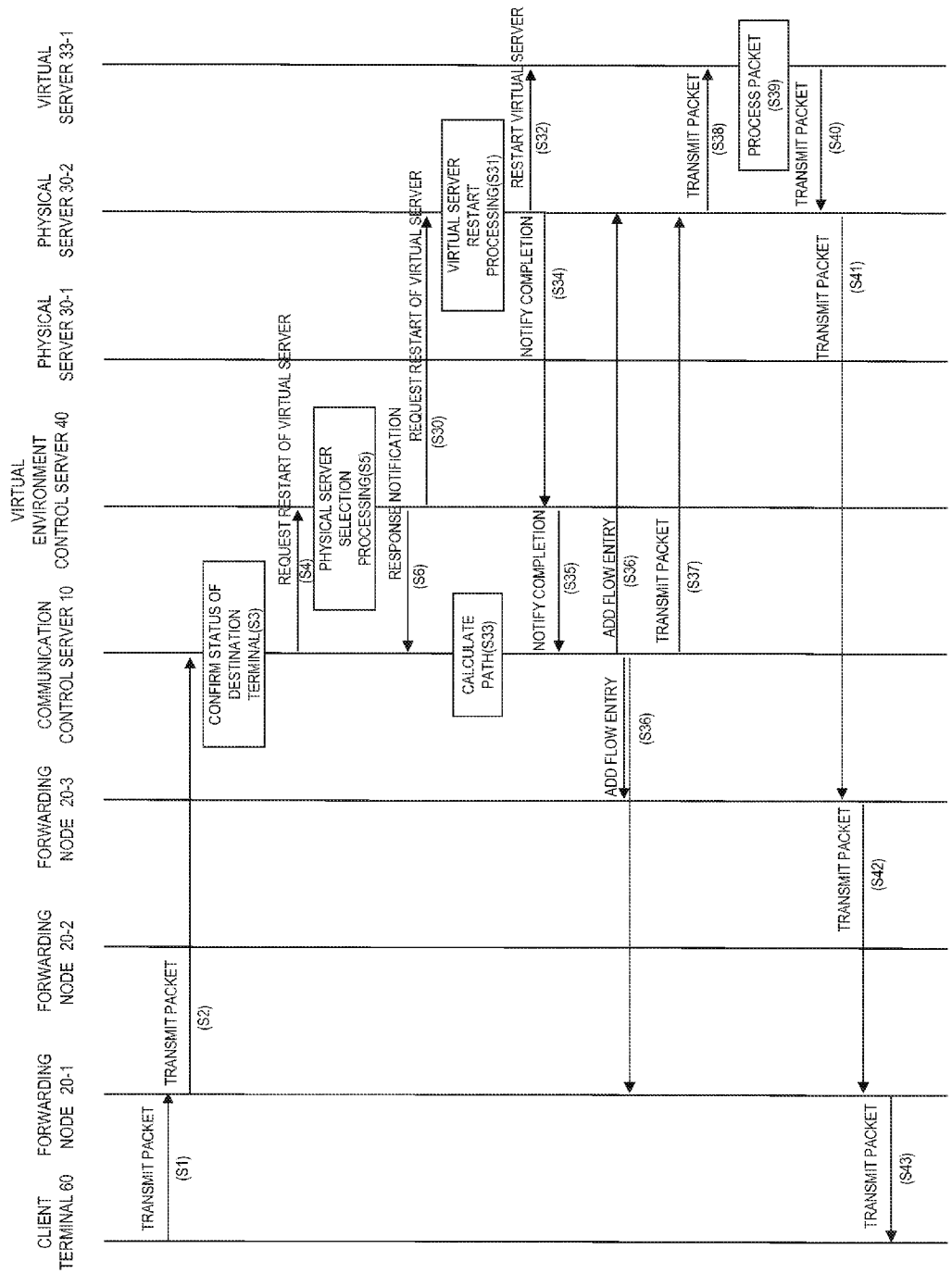
FIG. 8 is a sequence diagram showing an operation example of the computer system relating to the first exemplary embodiment.

Next, an operation in a case where the virtual server 33-1 is suspended and cannot be restarted on the physical server 30-1 will be described with reference to FIG. 8. FIG. 8 is a sequence diagram showing an operation example of the computer system in the present exemplary embodiment.

The operation from when the client terminal 60 transmits the packet to the virtual server 33-1 to when the communication control server 10 receives the response notification to the request for restarting the virtual server 33-1 is the same as the operation from the step S1 to the step S6 described with reference to FIG. 7. However, it is assumed here that the physical server 30-2 is selected as the physical server used for restarting the virtual server 33-1 in the step S5. As an example of the method for selecting the physical server for restarting, for instance, the physical server with the most available resources may be selected.

The virtual environment control server 40 requests the physical server 30-2, selected in the step S5, to restart the virtual server 33-1 (step S30).

The hypervisor unit 31 of the physical server 30-2 performs restart processing on the virtual server 33-1 (step S31).

At the completion of the step S31, the virtual server 33-1 starts to operate on the physical server 33-2 (step S32).

In parallel to the steps S30 to S32, the communication control server 10 calculates a path between the client terminal 60 and the virtual server 33-2 (step S33). Here, it is assumed that the calculated path between the client terminal 60 and the virtual server 33-1 goes through the forwarding node 20-1, the forwarding node 20-3, and the forwarding node unit 32 of the physical server 30-2 in this order.

The hypervisor unit 31 of the physical server 30-2 notifies the virtual environment control server 40 that the restart of the virtual server 33-1 has been completed (step S34).

The virtual environment control server 40 notifies the communication control server 10, which requested the virtual server to be restarted in the step S4, that the restart of the virtual server 33-1 has been completed (step S35).

The forwarding node control unit 11 of the communication control server 10 adds flow entries based on the calculated path to the forwarding nodes on the path calculated in the step S33 (step S36).

The forwarding node control unit 11 of the communication control server 10 transmits the packet received in the step S2 to the forwarding node unit 32 of the physical server 30-2, and instruct it to transmit the packet to the virtual server 33-1 (step S37).

The forwarding node unit 32 of the physical server 30-2 transmits the packet received in the step S37 to the virtual server 33-1 (step S38).

As in the step S16, the virtual server 33-1 processes the packet received in the step S38 (step S39).

The virtual server 33-1 transmits the packet created as a result of the step S39 to the client terminal 60 (step S40).

As in the step S18, the forwarding node unit 32 of the physical server 30-2 processes the packet received from the virtual server 33-1 and transmits the packet to the forwarding node 20-3 as a result thereof (step S41).

Similarly, the forwarding node 20-3 processes the packet received from the forwarding node unit 32 of the physical server 30-2 and transmits the packet to the forwarding node 20-1 as a result thereof (step S42). The forwarding node 20-1 processes the packet received from the forwarding node 20-3 and transmits the packet to the client terminal 60 via the network for communication 80 as a result thereof (step S43).

<Operation in Which the Virtual Server 33-1 Enters a Suspended State>

Figure 9:
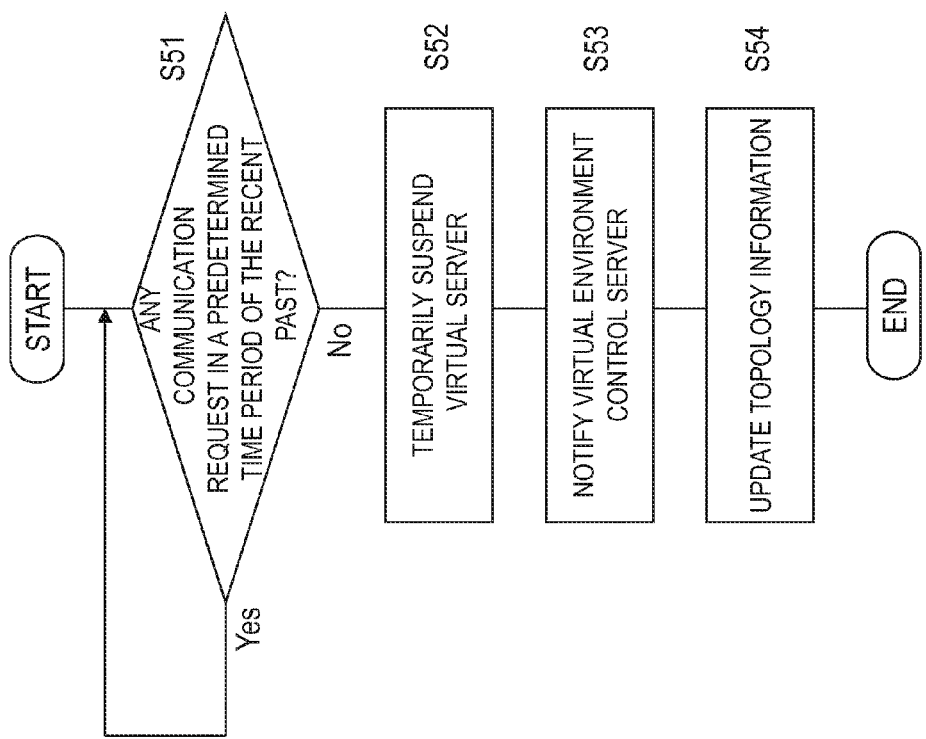
FIG. 9 is a sequence diagram showing an operation example of the computer system relating to the first exemplary embodiment.

Next, an operation in which the virtual server 33-1 enters a suspended state will be described using FIG. 9. FIG. 9 is a flowchart showing an operation example of the computer system relating to the present exemplary embodiment.

Whether or not a communication request to the virtual server 33-1 within a predetermined time period of the most recent past exists is confirmed (step S51).

The step S51 can be achieved by using various methods. For instance, the step S51 may be realized by a software program executed on the virtual server 33-1. In this case, the software on the virtual server 33-1 records the communication status and confirms whether or not a request exists within a predetermined time period of the most recent past based on the record.

Further, as another example, the step S51 may be realized by one of the forwarding nodes connected to the virtual server 33-1. In this case, the forwarding node records the communication status of the virtual server 33-1 and confirms whether or not a request exists within a predetermined time period of the most recent past based on the record.

When there is no communication request to the virtual server 33-1 within a predetermined time period of the most recent past (step S51), the virtual server 33-1 is suspended (step S52). By temporarily suspending the virtual server 33-1, the physical resources used by the virtual server 33-1 are freed and can be utilized for other uses (for instance running another virtual server).

The step S52 can be achieved by using various methods. For instance, in the case where the step S51 is executed by the software program running on the virtual server 33-1, this software program can realize the step S52 by starting suspend processing or hibernation processing on the virtual server 33-1. The hypervisor unit 31 of the physical server running the virtual server 33-1 detects this processing, and the hypervisor unit 31 temporarily suspends the virtual server 33-1.

Further, in the case where the step S51 is realized by the forwarding node connected to the virtual server 33-1, the step S52 can be realized by having this forwarding node request the hypervisor unit 31 of the physical server running the virtual server 33-1 or the virtual environment control server 40 to temporarily suspend the virtual server 33-1. The virtual environment control server 40 instructs the hypervisor unit 31 to temporarily suspend the virtual server 33-1 based on the request, and the hypervisor unit 31 suspends the virtual server 33-1.

The hypervisor unit 31 of the physical server that was running the virtual server 33-1 notifies the virtual environment control server 40 that the virtual server 33-1 is suspended (step S53). If the virtual environment control server 40 is involved in the suspend processing in the step S52, the step S53 may be omitted.

The virtual environment control server 40 notifies the communication control server 10 that the virtual server 33-1 is suspended, and the communication control server 10 updates the information regarding the virtual server 33-1 in the topology information based on this notification (step S54).

According to the present exemplary embodiment, a virtual server without any load is suspended as described above. Further, when a communication request to the virtual server in a suspended state occurs, the communication control server 10 detects it and restarts the virtual server via the virtual environment control server 40. At this time, the virtual server is restarted on a physical server suitable for the execution thereof, and a communication path corresponding to a new execution environment of the virtual server is set. Therefore, by temporarily suspending a virtual server without any load, the physical resources can be effectively utilized and the degradation of the communication response performance of the virtual server when a communication request occurs can be minimized.

Further, in the explanation of the computer system relating to the exemplary embodiment, the data and statuses (disk image, suspend image, snapshot, etc.) of a virtual server are stored in the storage server and shared by a plurality of physical servers, however, the present disclosure is not limited thereto. For instance, the data and statuses of a virtual server do not need to be shared by a plurality of physical servers and may be stored in a storage apparatus within the physical server running this virtual server. In this case, for instance, when the virtual server in a suspended state is restarted by another physical server, the data and statuses of this virtual server are forwarded from the physical server storing them to the physical server used for restarting the virtual server. As a result, it becomes possible to apply the present disclosure to a system without a storage server.

Further, in the explanation of the computer system relating to the exemplary embodiment, the method that selects the physical server with the most available resources is used as the method for selecting a physical server to restart the virtual server in the step S5, however, the present disclosure is not limited thereto. For instance, the physical server most suitable for the communication with the client terminal may be selected from the physical servers having sufficient resources necessary to restart the virtual server. Criteria for suitability may include the distance from the client terminal on the network (for instance the number of hops), link bandwidth, link utilization, or a combination of these. In this case, for instance, the virtual environment control server notifies the communication control server 10 of a list of physical server candidates in the step S5, and the communication control server 10 selects a physical server using its own network information and notifies the virtual environment control server 40 of the result. Consequently it becomes possible to execute the communication between the virtual server after the restart and the client terminal 60 more efficiently.

Further, the communication control server 10 and the virtual environment control server 40 are separate apparatuses in the computer system relating to the exemplary embodiment, however, these apparatuses may be integrated into a single apparatus.

(Second Exemplary Embodiment)

Next, a computer system in a second exemplary embodiment will be described with reference to the drawings.

In the computer system relating to the first exemplary embodiment, when a communication request to a virtual server in a suspended state occurs, the communication control server 10 always restarts the virtual server upon detecting the request. The present disclosure, however, is not limited thereto.

In the computer system relating to the present exemplary embodiment, when a communication request to a virtual server in a suspended state occurs, the communication control server 10 detects it and restarts the virtual server only when the communication request is valid for the virtual server (for instance it is a permitted request or processing subject).

Regarding the configuration and operation of the computer system relating to the present exemplary embodiment, what differs from the configuration and operation of the computer system relating to the first exemplary embodiment will be described below.

The virtual servers 33-1 to 33-*n* in the present exemplary embodiment holds a communication permission list indicating whether or not to respond to a communication request from the client terminal 60 and comprises a communication permission list management unit 33A (not shown in the drawings) that provides the other modules (such as the hypervisor units 31 of the physical servers 30-1 and 30-2) with the communication permission list.

Examples of the communication permission list include a list of communications permitted by a firewall in the virtual server and a list of communication port numbers in a standby mode in the virtual server. Further, examples of the firewall in the virtual server include iptables. However, the communication permission list and the firewall are not limited thereto.

In addition to the operations in the first exemplary embodiment, the hypervisor unit 31 of the physical servers 30-1 and 30-2 in the present exemplary embodiment acquires the communication permission list of a target virtual server from the communication permission list management unit 33A of the virtual servers 33-1 to 33-*n*, and notifies the virtual server control unit 41 of the virtual environment control server 40 of the list.

In addition to the operations in the first exemplary embodiment, the virtual server control unit 41 of the virtual environment control server 40 in the present exemplary embodiment acquires the communication permission list of each virtual server from the hypervisor unit 31 of the physical servers 30-1 and 30-2, and stores it with the status of each virtual server. Further, the virtual server control unit 41 notifies the communication permission list of the virtual server in response to a request from the other modules (such as the virtual environment cooperation unit 12 of the communication control server 10).

In addition to the contents in the first exemplary embodiment, the topology information storage unit 14 of the communication control server 10 in the present exemplary embodiment stores the communication permission list of the virtual server.

In addition to the operations in the first exemplary embodiment, the topology information management unit 13 of the communication control server 10 in the present exemplary embodiment collects the communication permission list of the virtual server.

In addition to the operations in the first exemplary embodiment, the virtual environment cooperation unit 12 of the communication control server 10 in the present exemplary embodiment requests the communication permission list of the virtual server.

When a packet received from the forwarding node is not permitted by the communication permission list of the destination virtual server of the packet, the forwarding node control unit 11 of the communication control server 10 in the present exemplary embodiment does not restart the destination virtual server and discard the packet, in addition to the operations in the first exemplary embodiment.

Next, an operation of the computer system according to the present exemplary embodiment will be described with reference to the drawings.

<Operation in Which the Client Terminal 60 Transmits a Packet to the Virtual Server 33-1>

An operation in which the client terminal 60 transmits a packet to the virtual server 33-1 is the same as the operation of the computer system relating to the first exemplary embodiment described with reference to FIGS. 7 and 8 when the packet is permitted by the communication permission list of the virtual server 33-1, with the following exceptions.

In addition to confirming the state of the destination terminal of the received packet in the step S3, the forwarding node control unit 11 of the communication control server 10 confirms the communication permission list of the destination terminal of the received packet, and confirms that the packet is permitted to be communicated by the destination terminal.

Figure 10:
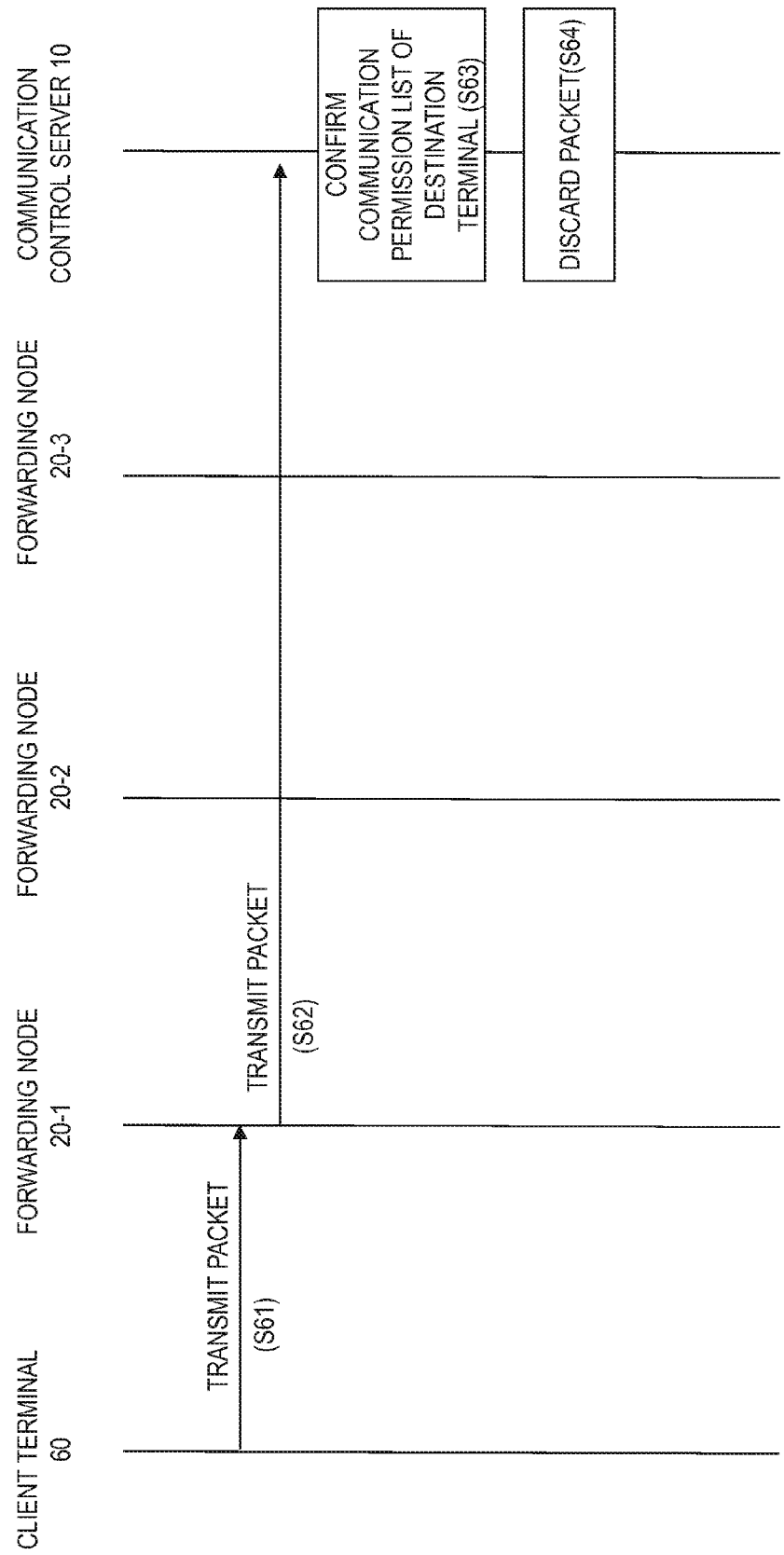
FIG. 10 is a sequence diagram showing an operation example of a computer system relating to a second exemplary embodiment.

An operation in which the client terminal 60 transmits a packet to the virtual server 33-1 in a case where the packet is not permitted by the communication permission list of the virtual server 33-1 will be described with reference to FIG. 10. FIG. 10 is a sequence diagram showing an operation example of the computer system relating to the present exemplary embodiment.

The client terminal 60 transmits a packet to the virtual server 33-1 (step S61). The packet is delivered to the forwarding node 20-1 via the network for communication 80.

The forwarding node 20-1 processes the packet received from the client terminal 60, and transmits the packet to the communication control server 10 as a result of the processing (step S62).

The forwarding node control unit 11 of the communication control server 10 confirms the communication permission list of the destination terminal of the received packet (step S63). More concretely, the forwarding node control unit 11 of the communication control server 10 refers to, for instance, the destination IP address of the received packet and the topology information stored in the topology information storage unit 14, identifies the destination terminal, and acquires the communication permission list thereof.

The forwarding node control unit 11 of the communication control server 10 compares the received packet with the communication permission list acquired in the step S63, and discards the packet when the communication of the packet is not permitted by the destination terminal (step S64).

According to the present exemplary embodiment, a virtual server without any load is suspended as described above. Further, when a communication request to a virtual server occurs, the communication control server 10 detects it, and discard the communication request when the communication of the communication request is not permitted by the virtual server. According to the present exemplary embodiment, the physical resources can be effectively utilized by minimizing unnecessary restart of virtual servers and the transmission of unnecessary communication requests.

Further, in the explanation of the computer system relating to the present exemplary embodiment, the virtual server control unit 41 of the virtual environment control server 40 acquires the communication permission list of a virtual server from the hypervisor unit 31 of the physical servers 30-1 and 30-2, however, the present disclosure is not limited thereto. The virtual server control unit 41 of the virtual environment control server 40 may directly acquire the communication permission list of a virtual server from the communication permission list management unit 33A of the physical servers 33-1 to 33-n, instead of the hypervisor unit 31 of the physical servers 30-1 and 30-2.

In the explanation of the computer system relating to the present exemplary embodiment, when detecting a communication request (packet) not permitted by the virtual server, the forwarding node control unit 11 of the communication control server 10 discard the packet, however, the present disclosure is not limited thereto. For instance, in addition to discarding the packet, a flow entry that discards the packet may be set in some (for instance the forwarding node that notified the request) or all of the forwarding nodes. This can be achieved by adding a step in which a flow entry with the flow of this packet as its matching flow and packet discarding as its action is set in a forwarding node (for instance the forwarding node 20-1) after the step S64. At this time, the communication request not permitted by the virtual server can be discarded at the stage of the forwarding node, reducing the load on the communication control server 10 and the control network 70.

Further, the disclosures of the above listed Patent Literatures and Non Patent Literatures are incorporated herein in its entirety by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof 10: communication control server
11: forwarding node control unit
12: virtual environment cooperation unit
13: topology information management unit
14: topology information storage unit
20-1 to 20-3: forwarding node
21: control channel processing unit
22: forwarding processing unit
23: flow table storage unit
30-1, 30-2: physical server
31: hypervisor unit
32: forwarding node unit
33, 33-1 to 33-n: virtual server
33A: communication permission list management unit
40: virtual environment control server
41: virtual server control unit
42: physical resource management unit
50: storage server
60: client terminal
70: control network
80: network for communication

What is claimed is:

1. A computer system, comprising:
a forwarding node that stores a flow and a packet handling operation defining processing for a packet belonging to the flow in association with each other, and processes a packet received from any other apparatus based on the packet handling operation;
a communication control server that controls the packet handling operation stored in the forwarding node; and
a physical server on which a virtual server operates, wherein
the communication control server comprises:
a memory that stores a set of instructions; and a hardware processor configured to execute the set of instructions to:

store a topology of a communication network including the forwarding node and the physical server, and an operating status of a virtual server(s) connected to the communication network;

request resuming an operation of a virtual server in a suspended state upon occurrence of a communication request to the suspended virtual server; and set a communication path for forwarding a packet for the communication request in the forwarding node, based on a location at which the suspended virtual server is connected to the communication network after resumption of the operation.

2. The computer system according to claim 1, wherein the hardware processor is configured to execute the set of instructions to:

control so that the packet for the communication request is transmitted to the suspended virtual server after completion of resumption of the operation of the suspended virtual server.

3. The computer system according to claim 2, wherein the suspended virtual server is suspended by releasing a physical resource of the physical server due to not receiving any communication request for a predetermined period.

4. The computer system according to claim 1, wherein the hardware processor is configured to execute the set of instructions to:

set a communication path for forwarding the packet for the communication request in the forwarding node in a case where a communication based on the communication request is permitted by the suspended virtual server, and otherwise discards the packet for the communication request.

5. The computer system according to claim 1, further comprising:

a virtual environment control server that selects a physical server that resumes an operation of the suspended virtual server from a plurality of physical servers, based on a state of each of the plurality of physical servers providing a virtual server and a topology of a communication network including the forwarding node and the plurality of physical servers, wherein the hardware processor of the communication control server is configured to execute the set of instructions to request the virtual environment control server to resume an operation of the suspended virtual server.

6. The computer system according to claim 5, wherein the virtual environment control server collects availability of a physical resource of each of the plurality of physical servers from each physical server.

7. The computer system according to claim 5, wherein the virtual environment control server preferentially selects a physical server on which the suspended virtual server had operated before being suspended as a physical server that resumes the operation of the suspended virtual server.

8. The computer system according to claim 5, wherein the virtual environment control server selects a physical server with most available physical resources as a physical server that resumes the operation of the suspended virtual server.

9. The computer system according to claim 5, wherein the virtual environment control server selects a physical server suitable for the communication with a client terminal that has transmitted the communication request as a physical server that resumes the operation of the suspended virtual server.

10. A communication control server, controlling a packet handling operation stored in a forwarding node that stores a flow and the packet handling operation in association with each other and processes a packet received from any other apparatus based on the packet handling operation, the packet handling operation defining processing for a packet belonging to the flow, the communication control server comprising:

a memory that stores a set of instructions; and a hardware processor configured to execute the set of instructions to:

store a topology of a communication network including the forwarding node and a physical server(s) on which a virtual server operates, and an operating status of a virtual server connected to the communication network;

resume an operation of a virtual server in a suspended state upon occurrence of a communication request to the suspended virtual server; and set a communication path for forwarding a packet for the communication request in the forwarding node, based on a location at which the suspended virtual server is connected to the communication network after resumption of the operation.

11. The communication control server according to claim 10, wherein the hardware processor is configured to execute the set of instructions to control so that the packet for the communication request Is transmitted to the suspended virtual server after completion of resumption of the operation of the suspended virtual server.

12. The communication control server according to claim 10, wherein the suspended virtual server is suspended by releasing a physical resource of the physical server due to not receiving any communication request for a predetermined period.

13. The communication control server according to claim 10, wherein the hardware processor is configured to execute the set of instructions to set a communication path for forwarding the packet with the communication in the forwarding node in a case where a communication based on the communication request is permitted by the suspended virtual server, and otherwise discards the packet for the communication request.

14. The communication control sever according to claim 10, wherein the hardware processor is configured to execute the set of instructions to:

request a virtual environment control server to resume an operation of the suspended virtual server, and select a physical server that resumes an operation of the suspended virtual server from a plurality of physical servers, based on a state of each of the plurality of physical servers providing a virtual server and a topology of a communication network including the forwarding node and the plurality of physical servers.

15. A communication control method, comprising:

by a communication control server that controls a packet handling operation stored in a forwarding node that stores a flow and the packet handling operation in association with each other and processes a packet received from any other apparatus based on the packet handling operation, the packet handling operation defining processing for a packet belonging to the flow, storing in a storage unit a topology of a communication network including the forwarding node and a physical server providing a virtual server, and an operating status of a virtual server connected to the communication network;

requesting resuming an operation of a virtual server in a suspended state upon occurrence of a communication request to the suspended virtual server; and setting a communication path for forwarding a packet for the communication request in the forwarding node, based on a location at which the suspended virtual server is connected the communication network after resumption of the operation.

16. The communication control method according to claim 15, wherein the communication control sever controls so that the packet for the communication request is transmitted to the suspended virtual server after completion of resumption of the operation of the suspended virtual server.

17. The communication control method according to claim 15, wherein the suspended virtual server is suspended by releasing a physical resource of the physical server due to not receiving any communication request for a predetermined period.

18. The communication control method according claim 15, wherein the communication control server sets a communication path for forwarding the packet with the communication in the forwarding node in a case where a communication based on the communication request is permitted by the suspended virtual server, and otherwise discards the packet for the communication request.

19. The communication control method according claim 15, further comprising:

requesting a virtual environment control server to resume an operation of the suspended virtual server, wherein the virtual environment control server selects a physical server that resumes an operation of the suspended virtual server from a plurality of physical servers, based on a state of each of the plurality of physical servers providing a virtual server and a topology of a communication network including the forwarding node and the plurality of physical servers.

* * * * *

UNITED STATES PATENT AND TRADEMARK OFFICE
CERTIFICATE OF CORRECTION

PATENT NO. : 9,571,379 B2
APPLICATION NO. : 14/407140
DATED : February 14, 2017
INVENTOR(S) : Yoshikazu Watanabe Page 1 of 1

It is certified that error appears in the above-identified patent and that said Letters Patent is hereby corrected as shown below:

In the Claims

Claim 11, Column 22, Line 30, "Is" should read as --is--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*